US011128483B1

(12) United States Patent
Surazski et al.

(10) Patent No.: US 11,128,483 B1
(45) Date of Patent: Sep. 21, 2021

(54) SYSTEM FOR PROVIDING A MEETING RECORD FOR PLAYBACK TO PARTICIPANTS IN AN ONLINE MEETING

(71) Applicant: Fuze, Inc., Boston, MA (US)

(72) Inventors: Luke Surazski, Cambridge, MA (US); Elias Sardonis, Cambridge, MA (US); Jedidiah Brown, Seattle, WA (US)

(73) Assignee: Fuze, Inc., Boston, MA (US)

(*) Notice: Subject to any disclaimer, the term of this patent is extended or adjusted under 35 U.S.C. 154(b) by 0 days.

(21) Appl. No.: 16/529,381

(22) Filed: Aug. 1, 2019

(51) Int. Cl.
*H04L 12/18* (2006.01)
*G06K 9/00* (2006.01)
*G10L 25/87* (2013.01)
*G06Q 10/10* (2012.01)

(52) U.S. Cl.
CPC ...... *H04L 12/1831* (2013.01); *G06K 9/00288* (2013.01); *G06K 9/00677* (2013.01); *G10L 25/87* (2013.01); *H04L 12/1822* (2013.01); *G06Q 10/1095* (2013.01)

(58) Field of Classification Search
CPC ...... A63H 2200/00; G06F 13/00; G06K 9/00; G06K 9/00288; G06K 9/00677; H04L 12/18; H04L 12/581; H04L 12/1818; H04L 12/1822; H04L 12/1827; H04L 12/1831; H04L 29/06; H04L 29/06027; H04L 29/08072; H04L 65/403; H04L 67/00; H04N 7/14; H04N 7/147; H04N 7/148; H04N 7/152; H04N 7/155; G09B 5/04; G09B 5/06; G09B 5/10; G09B 5/062; G09B 5/065; G09B 7/02; G06Q 10/10; G06Q 10/1095; G06Q 25/87

USPC .................................. 434/308; 709/204
See application file for complete search history.

(56) References Cited

U.S. PATENT DOCUMENTS

| | | | | |
|---|---|---|---|---|
| 6,125,398 | A * | 9/2000 | Mirashrafi | H04L 12/1822 370/263 |
| 9,609,277 | B1 * | 3/2017 | Chen | G11B 27/28 |
| 2015/0112676 | A1 * | 4/2015 | Merril | H04N 1/00267 704/235 |
| 2017/0011740 | A1 * | 1/2017 | Gauci | G06Q 30/0277 |
| 2019/0088153 | A1 * | 3/2019 | Bader-Natal | G09B 5/065 |
| 2019/0124128 | A1 * | 4/2019 | Bader-Natal | G06F 3/04817 |

* cited by examiner

*Primary Examiner* — Robert B Harrell
(74) *Attorney, Agent, or Firm* — McDermott Will & Emery LLP (57) ABSTRACT

A method for providing a meeting record to a meeting participant is provided. The method includes identifying a presence, in a meeting, of one participant and identifying a start of the meeting. The method also includes recording during the meeting, from the participant or from multiple participants, an audio, a video, and recording, from one of the participants in the meeting, a presentation. The method includes creating a meeting record with identifications of the participants in the meeting, the audio of the participant, the video of the participant, and the presentation from one of the participants in the meeting by forming a timeline file with a condensed transcript of highlights from the audio and the video, and providing the meeting record for a playback to a second participant in the meeting, upon request. A system and a non-transitory medium storing instructions to cause the system to perform the above method are also provided.

20 Claims, 8 Drawing Sheets

SYSTEM FOR PROVIDING A MEETING RECORD FOR PLAYBACK TO PARTICIPANTS IN AN ONLINE MEETING

BACKGROUND

Field

The present disclosure generally relates to a platform for real time group communications such as meetings and tele-conferences. More specifically, the present disclosure relates to a group meeting platform having a feature to record a real-time summary of the meeting for the benefit of the participants in the meeting.

Description of the Related Art

Current meeting platforms that enable multiple remote participants to join a meeting lack the capability of providing a quick update and summary of the meeting to all participants. Accordingly, participants scramble for information that may have been missed in the flow of the meeting, creating a frustrating experience. Some events that induced information loss for a participant during a meeting may include: late arrival, lack of concentration or distraction for a given lapse of time, or the need to step away for a few moments to attend an urgent need. To catch up with the meeting, participants may ask repetitious questions, or simply request a re-run of the meeting to cover a missing topic. Such scenario impacts negatively the flow of the meeting, and results in frustration not only for the participant involved, but also for the other participants, potentially resulting in a failed meeting.

SUMMARY

In one embodiment of the present disclosure, a computer-implemented method is described for identifying a presence, in a meeting, of at least one participant. The computer-implemented method includes identifying a start of the meeting, recording during the meeting, from the at least one participant or from multiple participants, an audio, and recording during the meeting, from the at least one participant or from multiple participants, a video. The computer-implemented method also includes recording, from one of the participants in the meeting, a presentation, creating a meeting record with identifications of the participants in the meeting, the audio of the at least one participant, the video of the at least one participant, and the presentation from one of the participants in the meeting by forming a timeline file with a condensed transcript of highlights from the audio and the video, and providing the meeting record for a playback to a second participant in the meeting, upon request.

According to one embodiment, a system is described that includes one or more processors and a memory coupled to the one or more processors, the memory including instructions that, when executed by the one or more processors, cause the system to identify a presence, in a meeting, of at least one participant. The one or more processors also execute instructions to identify a start of the meeting, to record during the meeting, from the at least one participant, an audio, and to record during the meeting, from the at least one participant or from multiple participants, a video. The one or more processors also include instructions to record, from one of the participants in the meeting, a presentation, and to create a meeting record with identifications of the participants in the meeting, the audio of the at least one participant, the video of the at least one participant, and the presentation from one of the participants in the meeting by forming a timeline file with a condensed transcript of highlights from the audio and the video. The one or more processors also execute instructions to provide the meeting record for a playback to a second participant in the meeting, upon request.

In one embodiment of the present disclosure, a computer-implemented method is described for accessing, via a client device through a network, a meeting hosted by a server and selecting a meeting record from a meeting menu provided by the server. The meeting record includes an identification of each of multiple participants in the meeting, an audio, from at least one participant, a video, from the at least one participant, and a presentation, from one of the participants, a presentation. The computer-implemented method also includes requesting, via the client device, to play a portion of the meeting record that includes a selected participant.

According to one embodiment, a non-transitory, machine-readable medium is described that includes instructions, which when executed by one or more processors, cause a computer to perform a method for identifying a presence, in a meeting, of at least one participant. The method also includes identifying a start of the meeting, recording during the meeting, from the at least one participant or from multiple participants, an audio, and recording during the meeting, from the at least one participant or from multiple participants, a video. The method also includes recording, from one of the participants in the meeting, a presentation, creating a meeting record with identifications of the participants in the meeting, the audio of the at least one participant, the video of the at least one participant, and the presentation from one of the participants in the meeting by forming a timeline file with a condensed transcript of highlights from the audio and the video, and providing the meeting record for a playback to a second participant in the meeting, upon request.

In yet another embodiment, a system is described that includes a means for storing commands and a means for executing the commands causing the system to perform a method including identifying a presence, in a meeting, of at least one participant, identifying a start of the meeting, and recording during the meeting, from the at least one participant or from multiple participants, an audio. The method also includes recording during the meeting, from the at least one participant or from multiple participants, a video, recording, from one of the participants in the meeting, a presentation, and creating a meeting record with identifications of the participants in the meeting, the audio of the at least one participant, the video of the at least one participant, and the presentation from one of the participants in the meeting by forming a timeline file with a condensed transcript of highlights from the audio and the video. The method also includes providing the meeting record for a playback to a second participant in the meeting, upon request.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

A problem that arises in the realm of social networking through mobile computer devices, especially during meetings, with multiple remote participants, is that one or more participants may need to catch up on missed information and events, during the meetings. The problem is exacerbated by the ability provided by advanced systems for participants to join the meeting from multiple, remote locations. Some of these locations may have intermittent network connectivity, or the participant may be forced to leave the meeting for at least a period of time (e.g., a late comer, or someone who steps away momentarily, or misses a portion of the meeting discussion). Currently available meeting software does not offer features to automatically generate a meeting record. Without any summarization technology, the participant is forced to either leave the meeting, attempt to collect the missed information later on, or simply interrupt the meeting and ask repetitious questions, to the detriment of all other participants. Embodiments as disclosed herein provide a technical solution to the above technical question by creating and making available, in real time and for all participants, a meeting record. This feature gives participants (and potential participants) of a meeting context for what has happened in the meeting so far. A meeting record is useful whether a participant is joining the meeting late, a participant had to step away, missed something that was just said, needs to review or double-check something from an earlier moment in the meeting, and the like. Features as described herein provide an overview of who is in the meeting, relevant summary and highlights driven by transcription, as well as controls to go back and see earlier detail from the meeting.

The disclosed system addresses the problem of providing an updated meeting record to all participants, which specifically arises in the realm of computer technology, by providing a solution also rooted in computer technology, namely, by using video/audio recording tools in a meeting support engine to create and make available a meeting record to participants, in real time. Accordingly, embodiments as disclosed herein include technical features that improve a meeting experience for all participants, making it more efficient and productive.

Some embodiments in the present disclosure include automatic participant identification (when desired, and authorized by the participants) to provide better meeting context to the participants. Some embodiments include transcripts of meeting conversations (including the identification of topics and people mentioned by name), and a live timeline of what has occurred in the meeting (joins, exits, screen shares, notes, topics, and the like). Some embodiments further provide controls enabling real time review of recordings of any portions of the meeting that a participant may have missed.

In some embodiments, a video recording of a meeting may include a highlight reel of a single participant, or may enable a mute function for a single participant during a desired portion of the recording. Other features in some embodiments may include identifying selected participants (e.g., highly relevant participants such as clients, project managers, or accounting employees), or people a user has been interested in during the past. Accordingly, some embodiments may extract and follow the contributions of the selected participants during the meeting. In some embodiments, the meeting record may enable a participant to jump to a specific event in the meeting (e.g., when a screen share occurred or is changed after being still for some time, a specific presentation starts, or the selected participant intervenes in a discussion). To do this, some embodiments implement a user-friendly visualization of the meeting record as one or more interactive timelines including simple visual identifiers for the participants and the types of documents available throughout the meeting.

Figure 1:
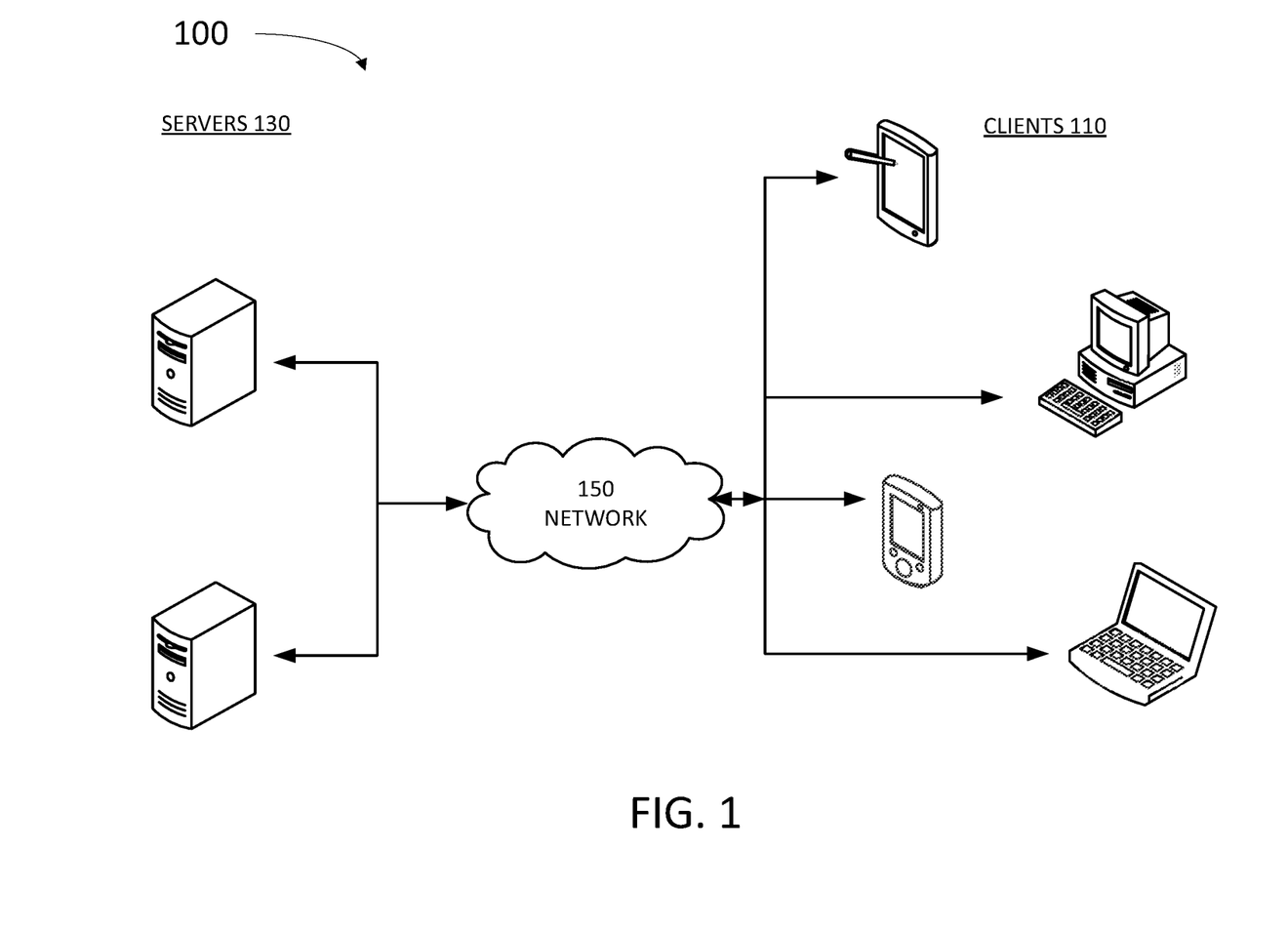
FIG. 1 illustrates an example architecture suitable to provide a platform for a meeting, according to some embodiments.

FIG. 1 illustrates an example architecture 100 suitable to provide a platform for a meeting, according to some embodiments. Architecture 100 includes servers 130 and clients 110 connected over a network 150. One of the many servers 130 is configured to host a memory including instructions which, when executed by a processor, cause server 130 to perform at least some of the steps in methods as disclosed herein. In some embodiments, the processor in server 130 is configured to host a meeting that a participant may access through client device 110. Further, in some embodiments, the processor in server 130 is configured to provide documents including images, video, and text messaging services to a participant in a meeting through client device 110. In some embodiments, the documents provided by server 130 to one or more participants may include an application-based document (e.g., a text-rich document such as a Word® document, a PDF document, or any other document accessible through a text editing application, including a computer code sequence, and the like), a spreadsheet document (e.g., Excel and the like), a presentation document (e.g., PowerPoint® and the like), an XML file, an HTML file, a multi-media file such as a video, audio, image file, or any combination of the above. Information related to, and instructions to handle the meeting may be stored in a summary engine 242 accessible by a participant through a client device 110 (e.g., accessible through a web page or an application 222 running on client device 110). Servers 130 can return images, documents, rich-text documents, and the like intended for a shared use and modification by multiple participants in a meeting. For purposes of load balancing, multiple servers 130 can host memories including instructions to one or more processors and multiple servers 130 for hosting one or more meetings as disclosed herein.

Servers 130 may include any device having an appropriate processor, memory, and communications capability for hosting the documents and applications associated with summary engine 242. Summary engine 242 may be accessible by multiple participants through various client devices 110 over the network 150. Client devices 110 can be, for example, desktop computers, mobile computers, tablet computers (e.g., including e-book readers), mobile devices (e.g., a smartphone or PDA), or any other devices having appropriate processor, memory, and communications capabilities for accessing summary engine 242 on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
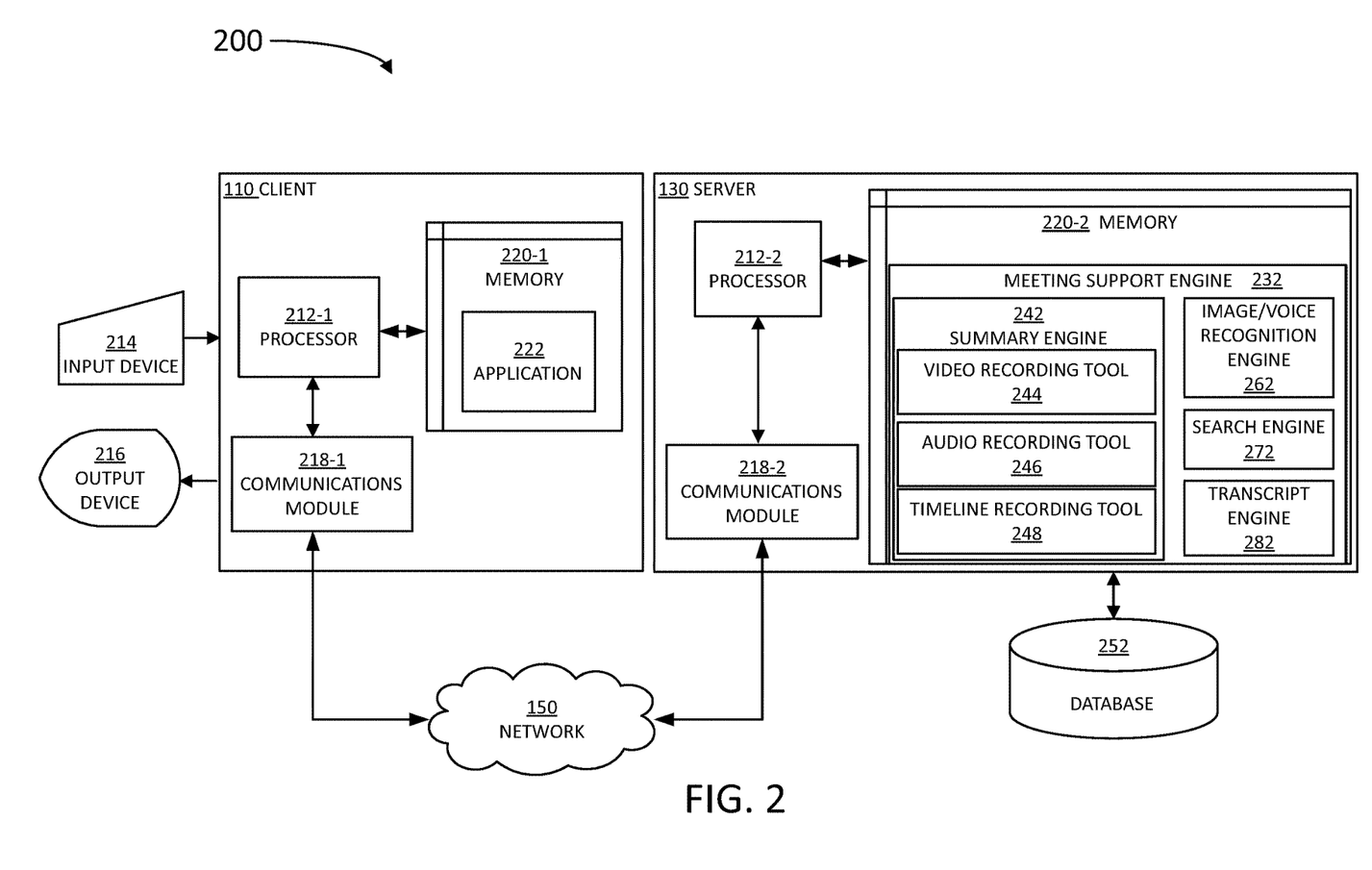
FIG. 2 is a block diagram illustrating an example server and client from the architecture of FIG. 1, according to certain aspects of the disclosure.

FIG. 2 is a block diagram 200 illustrating an example server 130 and client device 110 in the architecture 100 of FIG. 1, according to certain aspects of the disclosure. Client device 110 and server 130 are communicatively coupled over network 150 via communications modules 218-1 and 218-2 (hereinafter, collectively referred to as "communications modules 218"), respectively. Communications modules 218 are configured to interface with network 150 to send and receive information, such as data, requests, responses, and commands to other devices on the network. Communications modules 218 can be, for example, modems or Ethernet cards, and include radio hardware and software, such as radio-frequency (RF) antennas, modulators, demodulators, analog-to-digital converters, and digital-to-analog converters (DAC).

Client device 110 may be any one of a desktop computer, a laptop, or a mobile computing device. Client device 110 may include a processor 212-1 and a memory 220-1. An input device 214 and an output device 216 enable the user to interact with client device 110. Examples of input device 214 and output device 216 may include a mouse, a keyboard, a display, a touch-interactive display, and the like. In some embodiments, input device 214 may include a camera, a video camera, and a microphone. Accordingly, client device 110 may collect an audio signal, a video signal, or a combination thereof from the user (e.g., in a remote meeting event, for other participants to see and record), and transmit the signal to a server 130 through communications module 218-1.

Server 130 includes a memory 220-2, a processor 212-2, and communications module 218-2. The user interface is displayed for the user in an output device 216 of client device 110. Memory 220-2 includes a meeting support engine 232 to enable server 130 to support a network-based meeting of multiple remote participants (e.g., users of client devices 110). Meeting support engine may also include a summary engine 242, an image/voice recognition engine 262, and a search engine 272. Server 130 may also be communicatively coupled with a database 252, storing data and information collected from or provided to the multiple participants of a meeting, before or after the meeting starts or the meeting ends. Meeting support engine 232 includes instructions which, when executed by processor 212-2, cause server 130 to perform at least partially steps as disclosed herein. For example, meeting support engine 232 includes instructions to communicate with application 222 to incorporate the user of client device 110 as a participant of a meeting, as disclosed herein. Meeting support engine 232 may also include instructions to store a history log and other data related to a meeting as disclosed herein into database 252. Furthermore, in some embodiments, meeting support engine 232 may include instructions to retrieve at least some of the data in database 252 and provide to one or more participants in a meeting, as disclosed herein. Processors 212-1 and 212-2, and memories 220-1 and 220-2, will be collectively referred to, hereinafter, as "processors 212" and "memories 220," respectively.

In some embodiments, meeting support engine 232 stores and maintains for a selected period of time, data in database 252. Further, meeting support engine 232 updates different changes and modifications on a document or file discussed during the meeting, as part of a chat/topic history, as stored in database 252. In some embodiments, the activity, notes, and other actions taken by different participants over a document or any other topic item are displayed around the item, showing the specific participant that has participated in the activity. As mentioned above, the document stored by server 130 in database 252 may include an application-based document (e.g., a text-rich document such as a Word® document, a PDF document, or any other document accessible through a text editing application, including a computer code sequence, and the like), a spreadsheet document (e.g., Excel and the like), a presentation document (e.g., PowerPoint® and the like), an XML file, an HTML file, or a multi-media file such as a video, audio, image file, or any combination of the above.

A participant may access a meeting hosted by meeting support engine 232 through application 222 installed in memory 220-1 of client device 110. The participant may also access the meeting hosted by meeting support engine 232 via a web browser installed in client device 110. Execution of application 222 may be controlled by a processor 212-1 in client device 110. In some embodiments, application 222 is downloaded and installed by the participant into client device 110, from server 130.

Processor 212-2 is configured to execute instructions, such as instructions physically coded into processor 212-2, instructions received from software in memory 220-2, or a combination thereof. A participant using client device 110 may submit, through input device 214 a document or a media file (e.g., a video or an audio stream) to meeting support engine 232 via a user interface of application 222. The document or multi-media file submitted by the participant may include an application-based document (e.g., a text-rich document such as a Word®, document, a PDF document, or any other document accessible through a text editing application, including a computer code sequence, and the like), a spreadsheet document (e.g., Excel and the like), a presentation document (e.g., PowerPoint® and the like), an XML file, an HTML file or a multi-media file such as a video, audio, image file, or any combination of the above.

More specifically, meeting support engine 232 may include a summary engine 242 configured to create a meeting record and make it available to the meeting participants in real-time. To this end, summary engine 242 may include a video recording tool 244, an audio recording tool 246, and a timeline recording tool 248. Video recording tool 244 may be configured to receive video streams from one or more participants using client devices 110, and creating a library of video files organized according to the participants and the moment in time when the video was recorded, during the meeting. Audio recording tool 246 may be configured to do a similar task as video recording tool 244, but using audio streams from one or more participants using client devices 110. Timeline recording tool 248 may cooperate with video recording tool 244 and audio recording tool 246 to produce a timeline record of the meeting that includes video and audio stream from each of the multiple participants that intervened during the meeting. In some embodiments, timeline recording tool 248 may also retrieve a document presented by any one of the participants, during the meeting, and place the document in the appropriate niche along the timeline record for the meeting.

In some embodiments, video recording tool 244 and/or audio recording tool 246 may be configured to create separate video/audio files including the contributions to the meeting from each of the participants. These separate video/audio files may be available to the participants, during the meeting, through application 222.

In some embodiments, meeting support engine 232 may also include an image/voice recognition engine 262 and a search engine 272. Image/voice recognition engine 262 may be configured to receive the video and or audio stream from each of the participants in the meeting, and identify the respective participant. To do this, image/voice recognition engine 262 may apply digital pattern recognition techniques and algorithms, such as machine learning algorithms, artificial intelligence, or neural network trained algorithms, using data stored in database 252. In some embodiments, image/voice recognition engine 262 may be triggered into action after a permission is granted by one or all of the meeting participants to do so. Accordingly, image/voice recognition engine 262 may identify and include the name and contact information of each of the participants in the meeting record. Furthermore, in combination with timeline recording tool 248, this feature may enable for each participant to know, select and parse, at any time during the meeting, what was said by whom.

Moreover, in some embodiments, search engine 272 may be configured to receive a query from any one of the participants, in real time, to perform a search within the meeting record. For example, a participant may desire to find a specific screenshot provided by one of the other participants earlier in the meeting. In some embodiments, a participant may use search engine 272 to search for a particular term mentioned by one of the participants during a conversation stored in the meeting record. In that regard, meeting support engine 232 may also include a transcript engine 282, configured to transcribe an audio stream into a text file.

Some embodiments include artificial intelligence software and other nonlinear techniques such as neural networks or machine learning to identify for display, within the meeting record, topics of interest to a specific participant. Thus, for example, some embodiments may identify different portions during the meeting, more or less relevant to a main topic of the meeting. For example, in some embodiments, meeting support engine 232 may identify an introductory portion of the meeting based on known phrases (e.g., "hello" and until you get to "let's get started"). Accordingly, a timeline description of the meeting may include labels for the different meeting portions (welcome & introductions, project description, decision making, tasks, adjournment, and the like). The participant browsing the meeting record may decide to skip forward or backward through the different portions of the timeline. Moreover, in some embodiments, the meeting support engine 232 may identify and mark a decision making event in a meeting record. For example, meeting support engine 232 may record different participants in the session and their votes in a decision making poll (e.g., a "yes" or "no" decision).

In some embodiments, meeting support engine 232 may further create a template/patterning around types of meetings based on certain characteristics identified for the meeting. For example, in some embodiments, meeting support engine 232 may determine that a meeting that lasts 30 minutes and includes six (6) participants may typically include about three (3) minutes of irrelevant introduction, and then evolve into a round robin wherein each participant intervenes sequentially for a similar period of time. In some instances, meeting support engine 232 may identify a portion of the meeting devoted to a presentation (e.g., a silence followed by one participant talking followed by questions).

Figure 3:
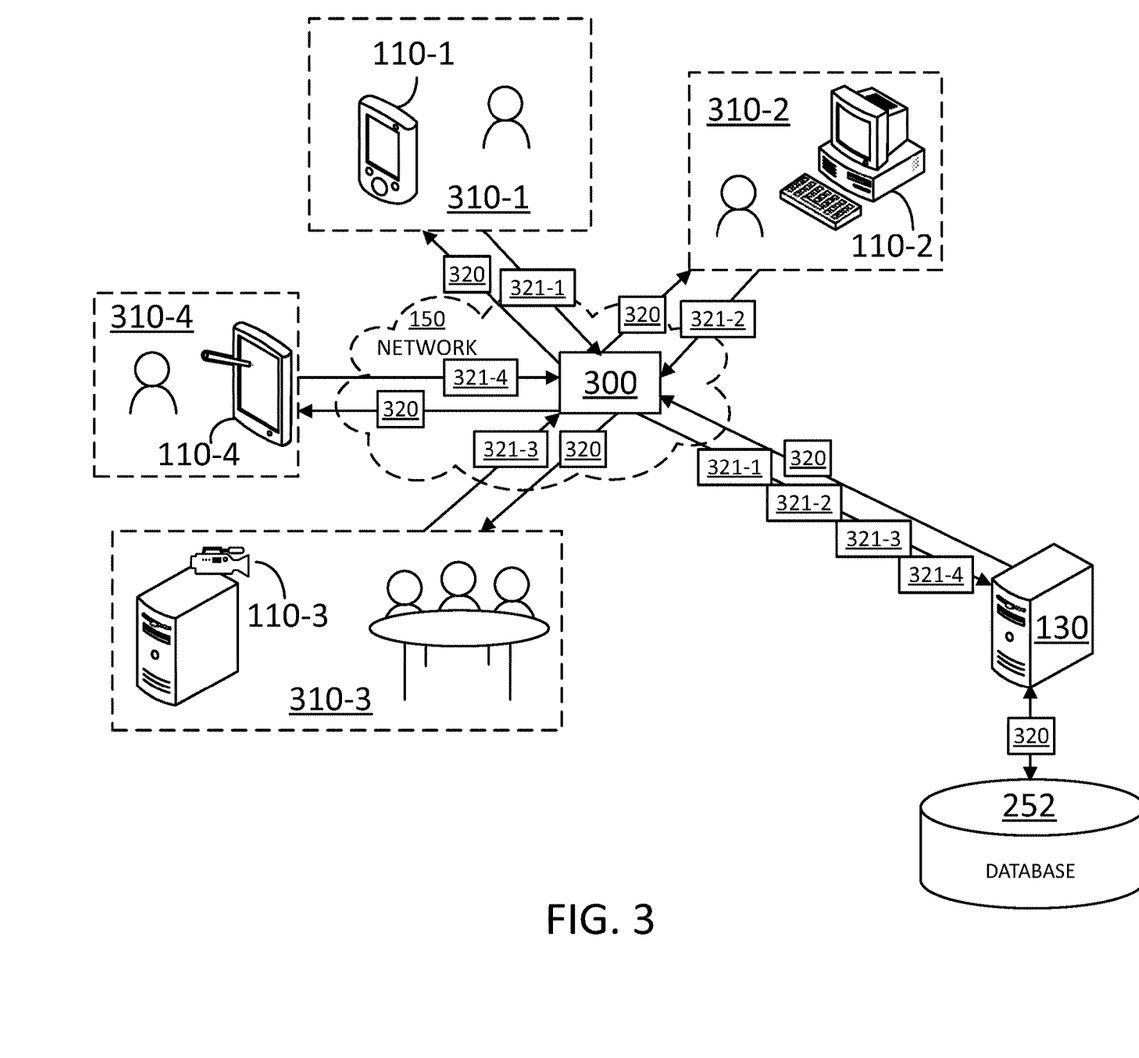
FIG. 3 illustrates a meeting hosted by a server through a network, including multiple remote participants using client devices, according to some embodiments.

FIG. 3 illustrates a meeting 300 hosted by a server 130 through a network 150, including multiple remote participants 310-1, 310-2, 310-3, and 310-4 (hereinafter, collectively referred to as "participants 310"), using client devices 110-1, 110-2, 110-3, and 110-4 (hereinafter, collectively referred to as "client devices 110"), according to some embodiments. Each of participants 310 may access meeting 300 using different client devices, for example a single participant 310-1 may use a smart phone 110-1 to access meeting 300. Another participant 310-2 may use a desktop 110-2 to access meeting 300. A third group of participants 310-3 may be set up in a conference room, and access the meeting through a workstation coupled to a video camera 110-3. A fourth participant 310-4 may access meeting 300 via a notepad 110-4. Client devices 110 may include video and audio input devices, such that a video/audio stream of meeting 300 may be provided to participants 310. Further, at least some of client devices 110 may include video and audio output devices to provide video/audio feeds 321-1, 321-2, 321-3, and 321-4 (hereinafter, collectively referred to as "video/audio feeds 321") of each of participants 310 to server 130 as a resource for meeting 300.

Using video/audio feeds 321, server 130 generates a meeting record 320 as disclosed herein, and makes it available to all participants in meeting 300. Furthermore, server 130 may store at least a portion of meeting record 320 in database 252.

Figure 4:
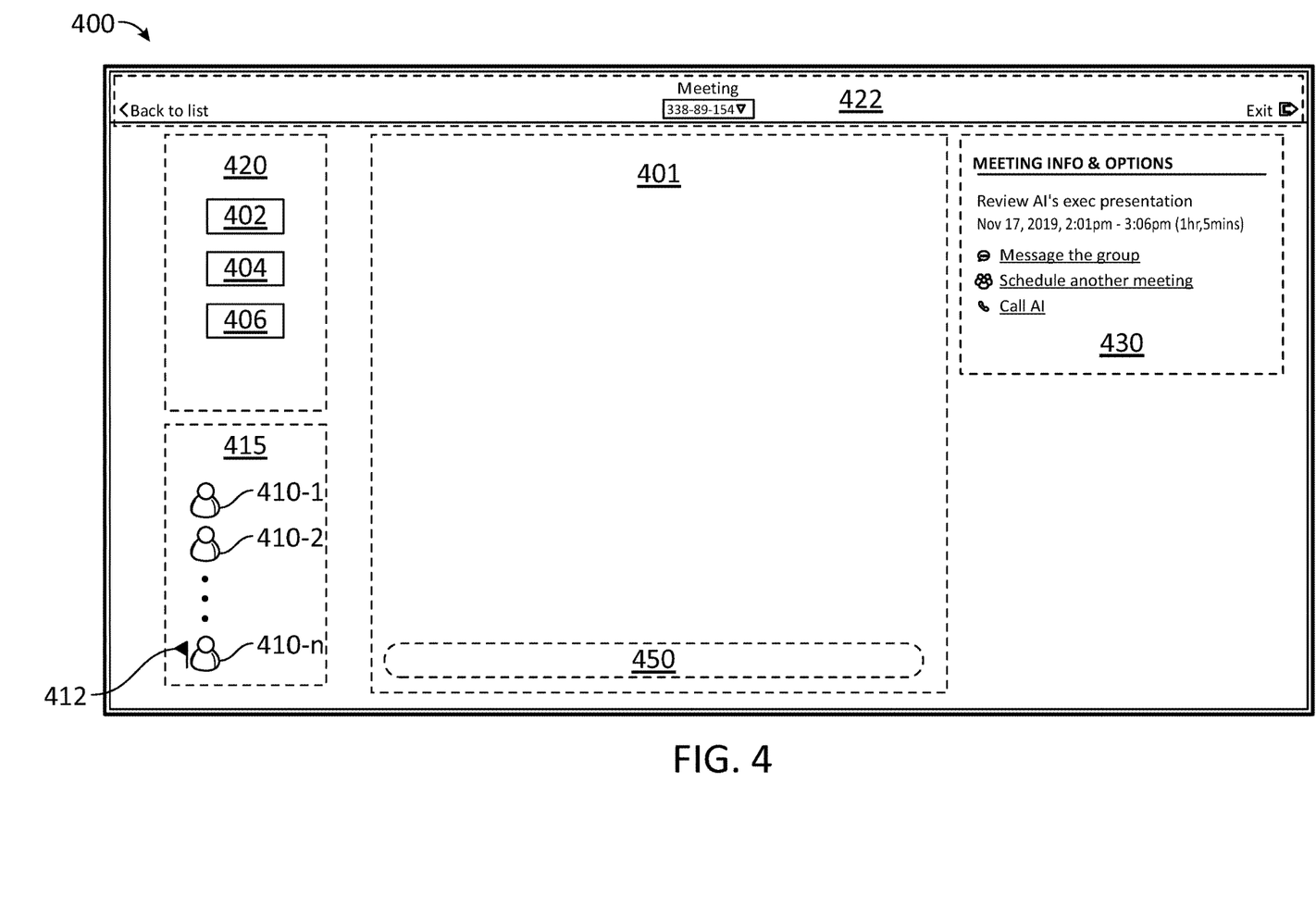
FIG. 4 illustrates a screen shot of an application supporting a meeting for multiple participants and providing a meeting record to the participants before the meeting is over, according to some embodiments.

FIG. 4 illustrates a screen shot 400 of an application 422 supporting a meeting for multiple participants and providing a meeting record 420 to the participants before the meeting is over, according to some embodiments. In some embodiments, application 422 is installed and running in a client device (cf. application 222 and client device 110), while hosted remotely via a meeting support engine in a server (e.g., server 130 and meeting support engine 232). Display 400 may be provided, at least partially, on a display in the client device (e.g., output device 216) used by any one of the participants in the meeting. In some embodiments, display 400 is similar for each of multiple devices 110 used by the different participants. In some embodiments, the nature and content of screen shot 400 may be determined by the capabilities of client device 110 for each participant. Screen shot 400 includes a central field 401 displaying details of the meeting, a settings field 430, a task bar 450, and a participants list 415.

Central field 401 may include a display for a presentation or any other multimedia file being presented for the participants, in the meeting. Meeting record 420 may include a summary and highlights of the meeting in real-time. For example, meeting record 420 may indicate topics covered and quotes from different participants during the meeting (including the source of the quotes). In some embodiments, an artificial intelligence or machine learning algorithm is configured to parse through the contents of meeting record 420, identify a topic of the meeting, and select quotes and information relevant for the topic of the meeting. Meeting record 420 may also include transcripts of one or more of the audio streams collected during the meeting (e.g., video/audio streams 321).

Other features in meeting record 420 may include an "Instant replay" button 402 that allows a participant to scrub backwards in the meeting timeline to replay an audio/video/screen share. The participant may desire to replay the meeting record for many reasons: arriving late to the meeting, having to step away, or simply to re-inforce or clarify a portion of the meeting. In some embodiments, the system automatically mutes a live audio capture from the participant while the participant replays the meeting record. In some embodiments, a "Get caught up" feature 404 shows a timeline-to-date, a condensed transcript of highlights (with the option to scan the full transcript), and optional video/audio replay to participants who are joining late (or not yet joined, but considering). A "Step away" button 406 enables the participant to flag itself as "away" from the meeting, so other participants are aware, thus avoiding confusion. Feature 404 provides the missing information for the returning participant.

Participants list 415 shows icons 410-1, 410-2, through 410-n (hereinafter, collectively referred to as "icons 410") corresponding to each of the participants in the meeting. A flag 412 may indicate that a participant (e.g., the participant identified with icon 410-n) may have activated step away button 406. In some embodiments, at least one of the participants may be identified by the system, and the name or an identifier for the participant may be displayed next to any one of icons 410. Some identification steps may include voice recognition or image recognition algorithms or various forms of caller ID when they are not signed in directly (as with participants sitting together in a conference room).

Settings field 430 includes miscellaneous meeting information and options, such as a tab for sending a message to a group of participants or to all participants, or an option to schedule another meeting (with same participants, e.g., a follow up meeting, or with different participants).

Figure 5:
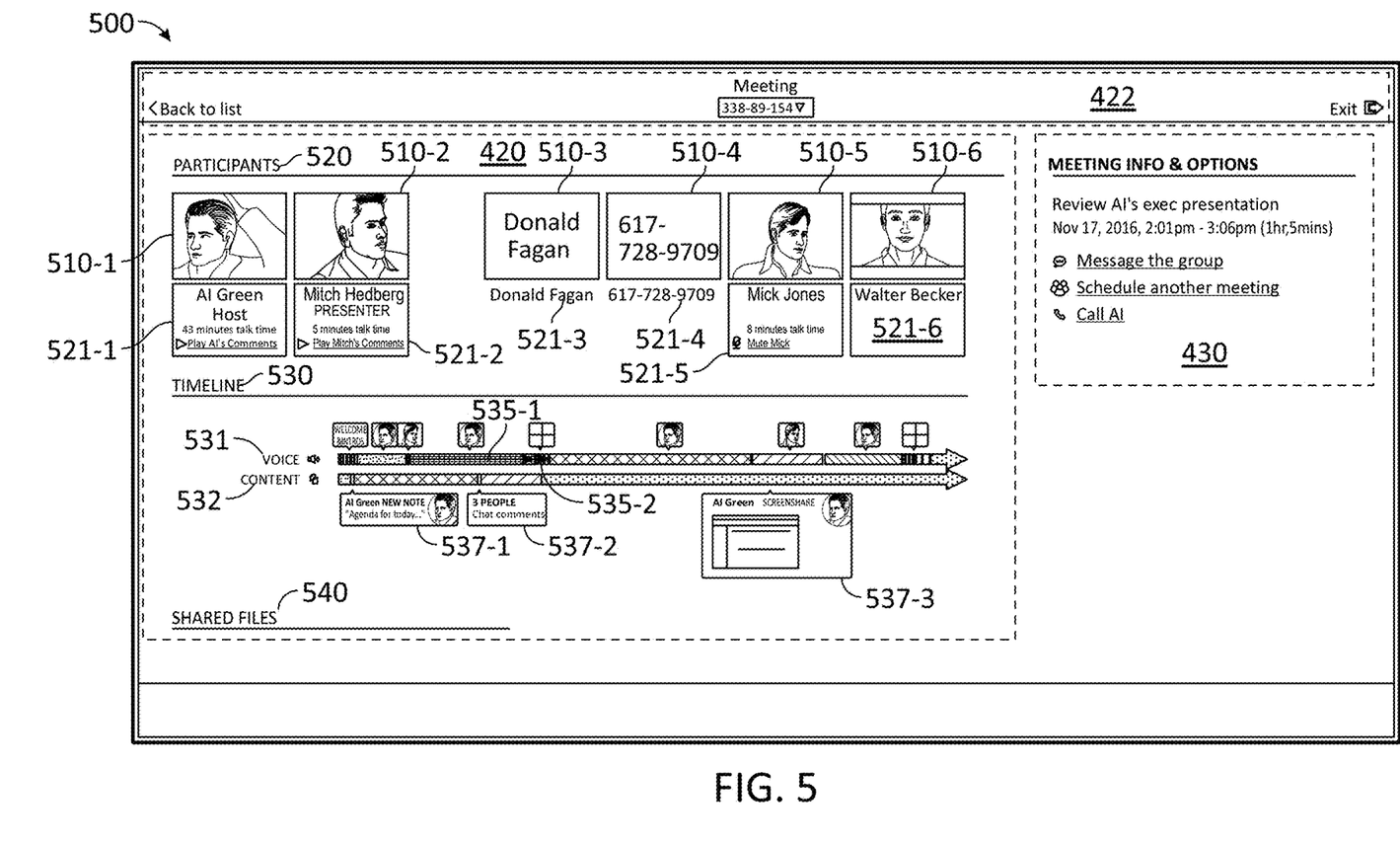
FIG. 5 illustrates a screen shot of a meeting record for one of the participants to play back before the meeting is over, according to some embodiments.

FIG. 5 illustrates a screen shot 500 of an application 422 including a meeting record 420 for one of the participants to play back before the meeting is over, according to some embodiments. In some embodiments, settings field 430 may be displayed on application 422, while the details of meeting record 420 are shown. In meeting record 420, a participants space 520 indicates meeting participants with icons 510-1, 510-2, 510-3, 510-4, 510-5, and 510-6 (hereinafter, collectively referred to as "icons 510"). Next to icons 510, application 422 illustrates identifiers 521-1, 521-2, 521-3, 521-4, 521-5, and 521-6 (hereinafter, collectively referred to as "identifiers 521"). In some embodiments, identifiers 521 may be obtained by application 422 from image/voice recognition of the respective participant. In some embodiments, identifiers 521 may be retrieved from a database including the names of each participant associated with an account or a client device registered with the meeting support engine (e.g., meeting support engine 232). Identifiers 521 may include a name of the participant, a telephone number, and an e-mail of the participant. In some embodiments, identifiers 521 may include a link to an audio/video file that includes comments and video of the contribution of each participant, during the meeting.

A timeline space 530 includes a voice timeline 531 and a content timeline 532. Voice timeline 531 includes thumbnails 535-1 and 535-2 illustrating one of icons 510 associated with the participant that is speaking at any given moment. Content timeline includes callouts 537-1, 537-2, and 537-3 (hereinafter, collectively referred to as "callouts 537"), indicating the type of contribution provided by any given participant (identified by a thumbnail of the respective icon) at the time indicated in the callout. In some embodiments, voice timeline 531 or content timeline 532 may be color coded according to the different participants that are contributing to the meeting for a given span of time. This feature is particularly useful for participants, as they may easily identify who was talking at any given moment of the meeting, thus enabling a more efficient parsing of the meeting record when looking for a desired information.

A shared files space 540 includes the files and documents that have been discussed and shared so far, during the meeting. In some embodiments, shared files space 540 may include audio files, video files, and other multi-media files shared by one or more participants in the meeting. For example, in some embodiments, shared files space 540 includes a transcript of the respective audio files from each time the participant speaks during the meeting.

Example System Architecture

Figure 6:
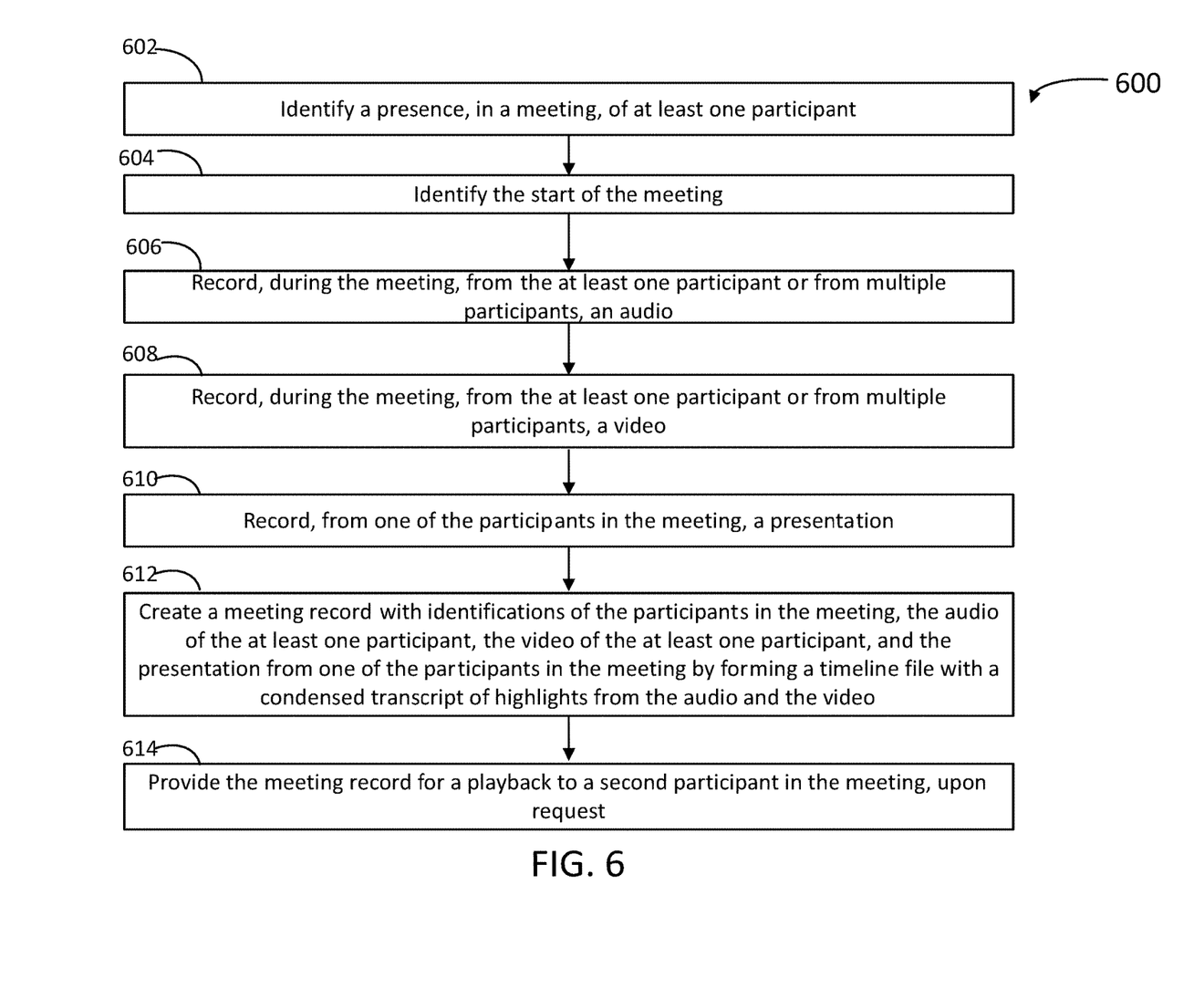
FIG. 6 is a flowchart illustrating steps in a method for creating a meeting record in a meeting support engine, according to some embodiments.

FIG. 6 is a flowchart illustrating steps in a method 600 for creating a meeting record in a meeting support engine, according to some embodiments. Method 600 may be performed at least partially by any one of the network servers hosting a meeting for multiple remote participants using client devices communicatively coupled with the network server through a network, using a communication module (e.g., server 130, participants 310, client devices 110, network 150, and communication modules 218). The network server may include a support engine, a summary engine, an image/voice recognition engine, a search engine, or a transcript engine (e.g., meeting support engine 232, summary engine 242, image/voice recognition engine 262, search engine 272, and transcript engine 282), as disclosed herein. At least some of the steps in method 600 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 600 may include retrieving, editing, and/or storing files in a database that is part of, or is communicably coupled to, the computer (e.g., database 252). Methods consistent with the present disclosure may include at least some, but not all, of the steps illustrated in method 600, performed in a different sequence. Furthermore, methods consistent with the present disclosure may include at least two or more steps as in method 600 performed overlapping in time, or almost simultaneously.

Step 602 includes identifying a presence, in a meeting, of at least one participant. In some embodiments, step 602 includes identifying all the participants in the meeting based on facial recognition, voice recognition, or a reference to the participant in the meeting. In some embodiments, step 602 includes identifying the participant based on a facial recognition or a voice recognition of the participant.

Step 604 includes identifying a start of the meeting. In some embodiments, step 604 includes identifying a topic of the meeting based on identifying the presence of the at least one participant. In some embodiments, step 604 includes identifying a topic of the meeting, and recording the audio and the video, and the presentation comprises weighting a content of the audio, the video, or the presentation based on the topic of the meeting.

Step 606 includes recording, during the meeting, from the at least one participant or from multiple participants, an audio.

Step 608 includes recording, during the meeting, from the at least one participant or from multiple participants, a video.

Step 610 includes recording, from one of the participants in the meeting, a presentation.

Step 612 includes creating a meeting record with identifications of the participants in the meeting, the audio of the at least one participant, the video of the at least one participant, and the presentation from one of the participants in the meeting. In some embodiments, step 612 includes forming a timeline file with a condensed transcript of highlights from the audio and the video. In some embodiments, step 612 includes selecting a portion of the video, the audio, or the presentation, based on a content and a relevance to a topic of the meeting. In some embodiments, step 612 includes transcribing into a text at least a portion of the audio. In some embodiments, step 612 includes receiving multiple video feeds and multiple audio feeds from one or more participants in the meeting, and selecting at least a portion of a video feed and a portion of an audio feed for the meeting record. In some embodiments, step 612 includes forming a timeline file with a condensed transcript of highlights from the audio and the video. In some embodiments, step 612 further includes flagging a participant in the meeting as 'away,' upon receiving a request from the participant.

Step 614 includes providing the meeting record for a playback to a second participant in the meeting, upon request. In some embodiments, step 614 may be performed before the end of the meeting.

Figure 7:
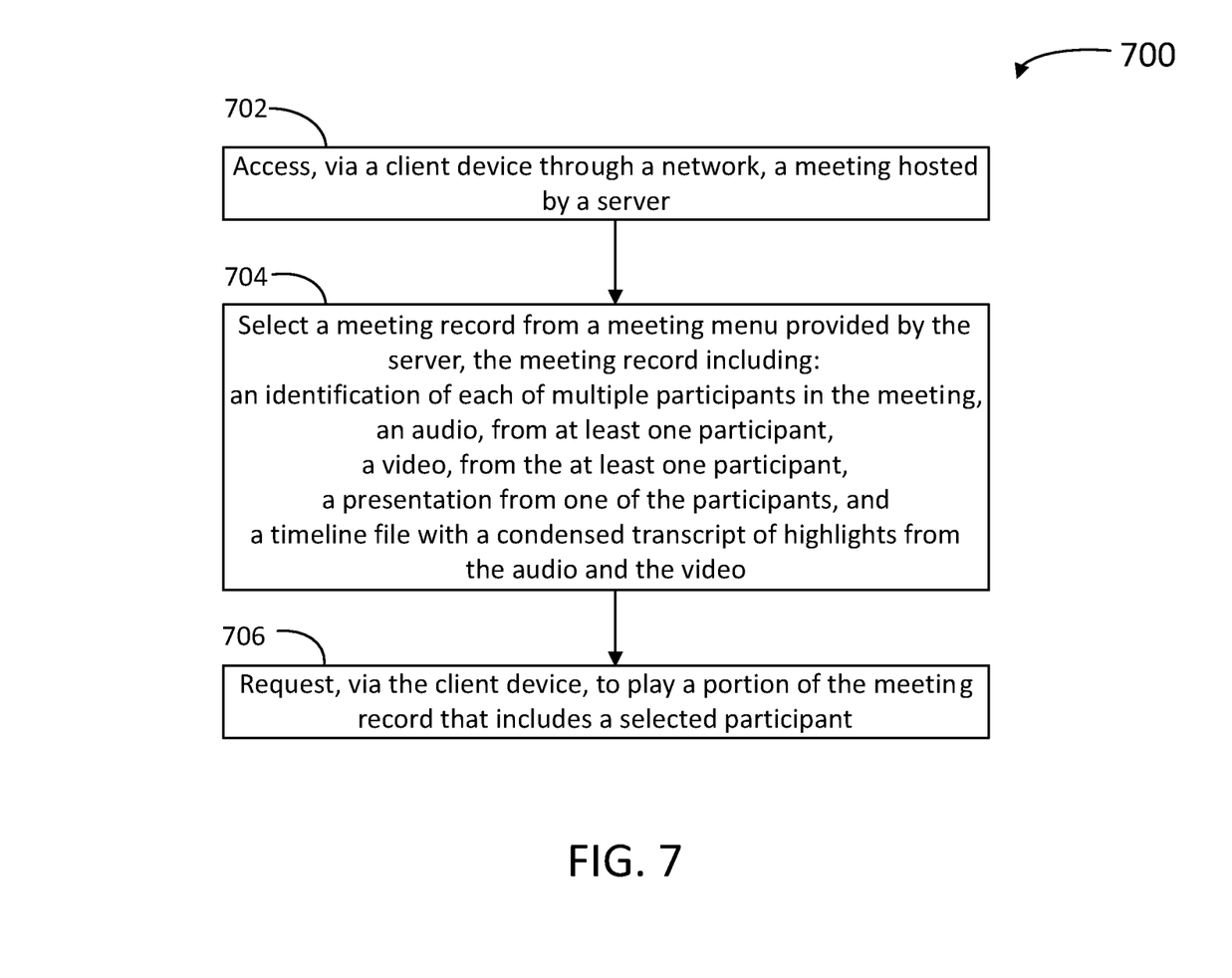
FIG. 7 is a flowchart illustrating steps in a method for accessing a meeting record by a participant with a client device, according to some embodiments.

FIG. 7 is a flowchart illustrating steps in a method 700 for accessing a meeting record by a participant with a client device, according to some embodiments. Method 700 may be performed at least partially by any one of the network servers hosting a meeting for multiple remote participants using client devices communicatively coupled with the network server through a network, using a communication module (e.g., server 130, participants 310, client devices 110, network 150, and communication modules 218). The network server may include a support engine, a summary engine, an image/voice recognition engine, a search engine, or a transcript engine (e.g., meeting support engine 232, summary engine 242, image/voice recognition engine 262, search engine 272, and transcript engine 282), as disclosed herein. At least some of the steps in method 700 may be performed by a computer having a processor executing commands stored in a memory of the computer (e.g., processors 212 and memories 220). For example, at least some of the commands may be included in an application installed in a client device accessible by a user (e.g., application 222). Further, steps as disclosed in method 700 may include retrieving, editing, and/or storing files in a database that is part of, or is communicably coupled to, the computer (e.g., database 252). Methods consistent with the present disclosure may include at least some, but not all, of the steps illustrated in method 700, performed in a different sequence. Furthermore, methods consistent with the present disclosure may include at least two or more steps as in method 700 performed overlapping in time, or almost simultaneously.

Step 702 includes accessing, via the client device and through the network, a meeting hosted by the server.

Step 704 includes selecting a meeting record from a meeting menu provided by the server, the meeting record including: an identification of each of multiple participants in the meeting, an audio, from at least one participant, a video, from the at least one participant, a presentation from one of the participants, and a timeline file with a condensed transcript of highlights from the audio and the video. In some embodiments, step 704 includes inputting a search query in a search engine to search for a portion of interest in the meeting record.

Step 706 includes requesting, via the client device, to play a portion of the meeting record that includes a selected participant. In some embodiments, step 706 includes selecting the portion of the meeting record based on a timeline provided by the server for display in the client device.

Hardware Overview

Figure 8:
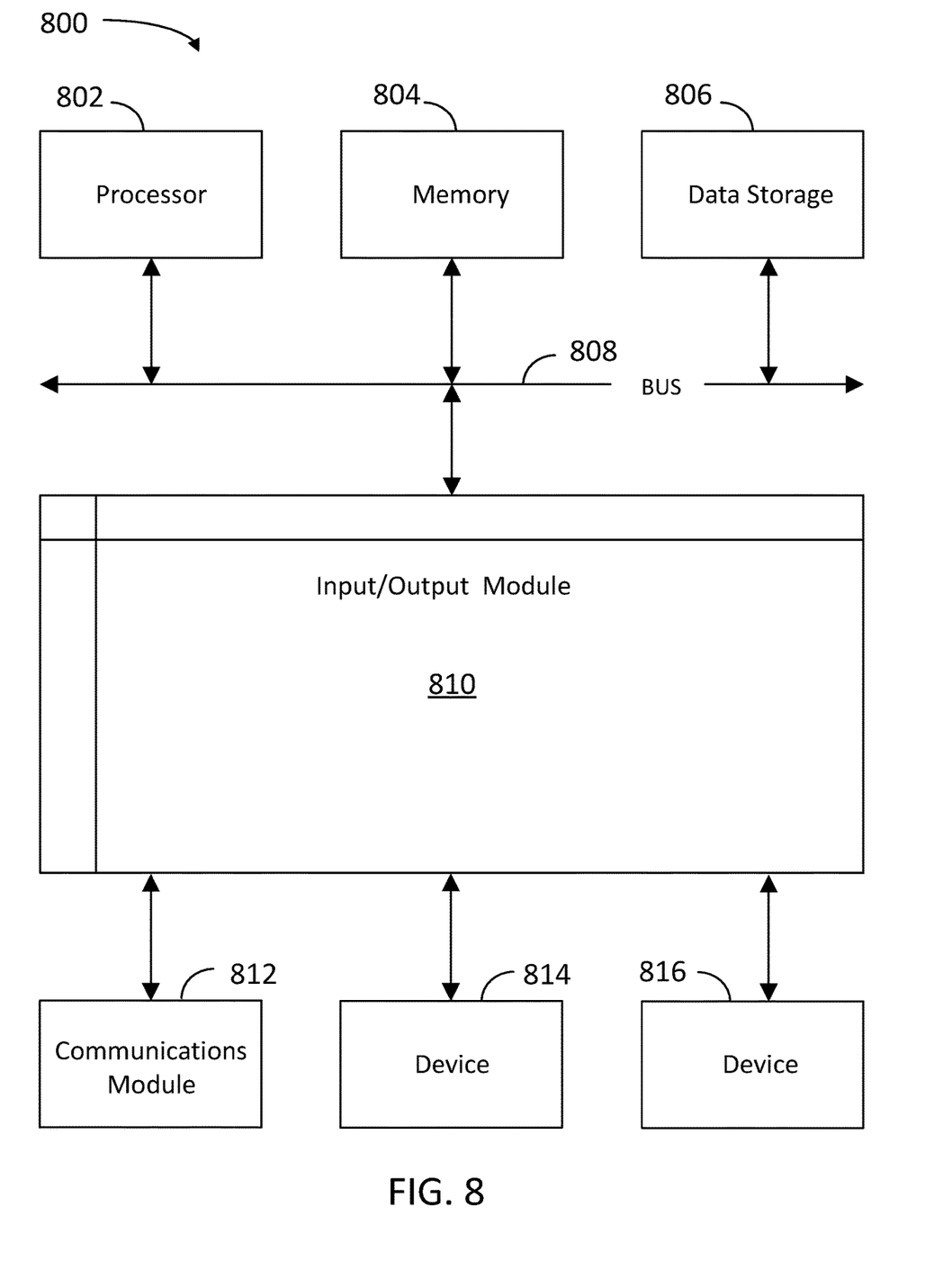
FIG. 8 is a block diagram illustrating an example computer system with which the client and server of FIGS. 1 and 2, and the methods of FIGS. 6 and 7 can be implemented, according to some embodiments.

FIG. 8 is a block diagram illustrating an exemplary computer system 800 with which the client device 110 and server 130 of FIGS. 1-3, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client device 110 and server 130) includes a bus 808 or other communication mechanism for communicating information, and a processor 802 (e.g., processors 212) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, a code that creates an execution environment for the computer program in question, e.g., code that constitutes processor firmware, a protocol stack, a database management system, an operating system, or a combination of one or more of them stored in an included memory 804 (e.g., memories 220), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, a special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well known to those skilled in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client device 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship with each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, flexible disk, hard disk, magnetic tape, any other magnetic medium, CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
identifying a presence, in a meeting, of at least one participant;
identifying a start of the meeting;
recording, during the meeting, from the at least one participant or from multiple participants, an audio;
recording, during the meeting, from the at least one participant or from the multiple participants, a video;
recording, from one of the participants in the meeting, a presentation;
creating a meeting record with identifications of the participants in the meeting, the audio of the at least one participant, the video of the at least one participant, and the presentation from one of the participants in the meeting by forming a timeline file with a condensed transcript of highlights from the audio and the video; and
providing the meeting record for a playback to a second participant in the meeting upon request,
wherein forming the timeline file comprises color coding a timeline using different colors for different participants that contribute to the meeting for a given span of time.

2. The computer-implemented method of claim 1, wherein identifying the presence, in the meeting, of the at least one participant comprises identifying all the participants in the meeting based on facial recognition, voice recognition, or a reference to the at least one participant in the meeting.

3. The computer-implemented method of claim 1, wherein identifying the presence of the at least one participant comprises identifying the at least one participant based on a facial recognition or a voice recognition of the at least one participant.

4. The computer-implemented method of claim 1, further comprising identifying a topic of the meeting based on the identifying the presence of the at least one participant.

5. The computer-implemented method of claim 1, further comprising identifying a topic of the meeting, wherein recording the audio, the video, and the presentation comprises weighting a content of the audio, the video or the presentation based on the topic of the meeting.

6. The computer-implemented method of claim 1, wherein creating the meeting record comprises selecting a portion of the video, the audio, or the presentation based on a content and a relevance to a topic of the meeting.

7. The computer-implemented method of claim 1, wherein creating the meeting record comprises transcribing into a text at least a portion of the audio.

8. The computer-implemented method of claim 1, wherein creating the meeting record comprises receiving multiple video feeds and multiple audio feeds from one or more participants in the meeting, and selecting at least a portion of a video feed and a portion of an audio feed for the meeting record.

9. The computer-implemented method of claim 1, wherein creating a meeting record comprises creating one recording for each participant of the meeting, and muting, in each recording, all other participants of the meeting.

10. The computer-implemented method of claim 1, further comprising flagging a participant in the meeting as 'away,' upon receiving a request from the participant.

11. A system comprising:
a memory storing instructions; and
one or more processors configured to execute the instructions to cause the system to:
identify a presence, in a meeting, of at least one participant;
identify a start of the meeting;
record, during the meeting, from the at least one participant, an audio;
record, during the meeting, from the at least one participant or from multiple participants, a video;
record, from one of the participants in the meeting, a presentation;
create a meeting record with identifications of the participants in the meeting, the audio of the at least one participant, the video of the at least one participant, and the presentation from one of the participants in the meeting, to form a timeline file with a condensed transcript of highlights from the audio and the video; and
provide the meeting record for a playback to a second participant in the meeting, upon request, wherein to form a timeline file comprises to color code a timeline, using different colors for different participants that contribute to the meeting for a given span of time.

12. The system of claim 11, wherein to identify a presence of at least one participant the one or more processors execute instructions to identify the participant based on a facial recognition or a voice recognition of the participant.

13. The system of claim 11, wherein the one or more processors further execute instructions to identify a topic of the meeting based on the identifying the presence of the at least one participant.

14. The system of claim 11, wherein to identify the presence, in the meeting, of at least one participant the one or more processors execute instructions to identify all the participants in the meeting based on a facial recognition, a voice recognition, or a reference to the participant in the meeting.

15. The system of claim 11, wherein the one or more processors further execute instructions to:
identify a topic of the meeting; and
to record the audio, the video, and the presentation comprises to weigh a content of the audio, the video or the presentation based on the topic of the meeting.

16. The system of claim 11, wherein to create a meeting record the one or more processors execute instructions to select a portion of the video, the audio, or the presentation, based on a content and a relevance to a topic of the meeting.

17. The system of claim 11, wherein the one or more processors further execute instructions to flag a participant in the meeting as 'away,' upon receiving a request from the participant.

18. A computer-implemented method comprising:
accessing, via a client device through a network, a meeting hosted by a server;
selecting a meeting record from a meeting menu provided by the server, the meeting record comprising:
an identification of each of multiple participants in the meeting,
an audio, from at least one participant,
a video, from the at least one participant,
a presentation, from one of the participants, and
a timeline file with a condensed transcript of highlights from the audio and the video; and
requesting, via the client device, to play a portion of the meeting record that includes a selected participant, wherein forming the timeline file comprises color coding a timeline, using different colors for different participants that contribute to the meeting for a given span of time.

19. The computer-implemented method of claim 18, wherein selecting the meeting record comprises inputting a search query in a search engine to search for a portion of interest in the meeting record.

20. The computer-implemented method of claim 18, wherein requesting to play a portion of the meeting record that includes a selected participant comprises selecting the portion of the meeting record based on a timeline provided by the server for display in the client device.

* * * * *